Patented Sept. 7, 1943

2,328,547

UNITED STATES PATENT OFFICE 2,328,547

METHOD FOR STABILIZING ORGANIC THIONITRITES

George S. Crandall, Woodbury, N. J., Richard S. George, State College, Pa., and Edwin M. Nygaard, Woodbury, N. J., assignors to Socony-Vacuum Oil Company, Incorporated, New York, N. Y., a corporation of New York No Drawing. Application June 27, 1940, Serial No. 342,692

17 Claims. (Cl. 44—76)

This invention has to do with the stabilization of organic thionitrites and is more particularly concerned with the stabilization of an organic thionitrite in solution in a suitable solvent.

The method of the present invention had its origin in the observation that organic thionitrites were effective to improve the ignition quality of hydrocarbon fuels for compression ignition engines, which was attended by the further observation that the instability of organic thionitrites made their practical value in this regard questionable.

In preparing a fuel blend for compression ignition or Diesel engines with an organic thionitrite, the thionitrite may be added to the fuel in the pure state, it may be added to the fuel in solution in a suitable solvent, or it may be form 1 in situ in the fuel or in another suitable solvent, which in turn can be blended with the fuel. It is important, therefore, that the organic thionitrite be substantially stable against decomposition both prior to and after its addition to the fuel, and the present invention is broadly directed to a method for effecting such stabilization irrespective of the solvent in which it is dissolved. Typical solvents for the organic thionitrites are ether, carbon disulfide, carbon tetrachloride, and liquid hydrocarbons such as benzene, hexane, and petroleum fractions such as gasoline, kerosene, fuel oils and heavier fractions such as lubricating oils.

The organic thionitrites are compounds having the general formula RSNO. They may be synthesized in various ways as by the reaction of a mercaptan with nitrosyl chloride, or preferably by the interreaction of a mercaptan with an alkali nitrite and a mineral acid in a non-homogeneous liquid system as described in our copending application Serial No. 338,736, filed June 4, 1940.

Although, as aforesaid, this invention is broadly directed to the stabilization of organic thionitrites in solution irrespective of the solvent, the principal object of the present invention is to provide a method for stabilizing organic thionitrites in Diesel fuel oil blends containing same. The instability of organic thionitrites in Diesel fuel oil solutions manifests itself by the loss of the typical thionitrite color, development of sludge or sludgy materials and loss of the enhanced ignition quality.

Our invention is predicated upon the discovery that a Diesel fuel oil-organic thionitrite blend can be stabilized by admixing therewith a minor proportion of a compound which will prevent the accumulation of the higher oxides of nitrogen in the blend. This may be explained on the theory that the higher oxides of nitrogen apparently accelerate, by catalytic action and by direct reaction, the decomposition of the thionitrite and are instrumental in the formation of sludge and sludgy materials from constituents naturally occurring in the fuel oil.

The compounds which will prevent the accumulation of oxides of nitrogen in the blend may be roughly divided into two classes, depending upon the manner in which their purpose is accomplished. Thus, the accumulation of the higher oxides of nitrogen may be prevented by adding to the blend a compound which will absorb or react with such oxides as they are formed to form stable, harmless products. Also, as will hereinafter appear, this may be accomplished by the addition of a compound which has antioxidant properties—that is, a compound which will act as a negative catalyst toward the oxidation of organic thionitrites or nitric oxide or both.

In further explanation of the foregoing it has been shown (Ber. 59, 1314 (9926)) that organic thionitrites are subject to two types of decomposition: namely, "Thermal decomposition," which takes place slowly at room temperature and in which the thionitrite decomposes irreversably to the disulfide and nitric oxide according to the following equation:

$$2RSNO \rightarrow R-SS-R + 2NO$$

and "Auto oxidation," wherein the thionitrite is rapidly decomposed in the presence of oxygen into the disulfide and nitrogen tetroxide according to the following equation:

$$2RSNO + O_2 \rightarrow R-SS-R + N_2O_4$$

The nitric oxide formed in the former decomposition is oxidized to the higher oxides which, as stated above, apparently act catalytically to accelerate the decomposition of the thionitrite and react with naturally occurring constituents in the oil, such as unsaturated hydrocarbons, etc., to form sludgy materials. The higher oxides of nitrogen ($N_2O_3$ and $N_2O_4$) also react with many of the thionitrites to set up chain reactions which ultimately lead to sulfonic acids, sulfones, etc., and oxides of nitrogen.

Thus, it will be seen that the various deterioration phenomena may be retarded by adding to the blend a compound which will actually remove the higher oxides of nitrogen as they are formed or which will act as an antioxidant to prevent their formation. We have found that there are numerous compounds or materials which may be readily dissolved in an organic thionitrite solution such as a Diesel fuel oil-thionitrite blend to accomplish the purpose of this invention. Some of these materials apparently act by absorbing or reacting with the oxides of nitrogen; others are compounds known to be antioxidants; and still others act both as nitrogen oxide absorbers and as antioxidants.

We have found that there are several general classes of compounds which may be effectively used to prevent the accumulation of oxides of nitrogen in an organic thionitrite solution such as the aforesaid Diesel fuel-thionitrite blend; also that there are numerous specific compounds which do not fall into such classes but which are also effective in this regard.

Typical classes of compounds contemplated herein whose stabilizing action may be explained in part, at least, by their ability to remove oxides of nitrogen from the blend are: aliphatic amines, aromatic amines, alkylol amines, aliphatic alcohols, aliphatic mercaptans, and organic esters. Typical classes, the action of which may be explained on the antioxidant theory, are aromatic amines, secondary and tertiary aliphatic amines, and aliphatic mercaptans. It will be observed that some of these classes fall into both groups, and the present invention is not so much concerned with the specific manner in which the stabilizer acts but broadly contemplates compounds which are effective to prevent the accumulation of oxides of nitrogen in the blend irrespective of the manner in which this is accomplished.

Of the various compounds contemplated herein as stabilizers for Diesel fuel oil-organic thionitrite blends, the following are typical examples:

(A) Compounds having the general formula

in which $R_1$, $R_2$ and $R_3$ are selected from the group consisting of hydrogen, alkyl, aryl, aralkyl, alkaryl, and hydroxy alkyl. Typical compounds falling in this group are ammonia; the aliphatic amines, such as monocyclohexylamine, dicyclohexylamine, triethylamine, diethylamine, diamylamine, triamylamine, tetradecylamine, dimethyl cetyl amine, etc.; the aromatic amines, such as aniline, mixed toluidines, monoethylaniline, dimethyl aniline, c-diamyl aniline, N-diamyl aniline, N-dimethyl aniline, p-dodecyl aniline, wax-aniline, etc.; and the alkylol amines, such as mixed isopropanol amines, etc. Of the compounds in this class preference is given to the aromatic amines and from the standpoint of economy particular preference is given to N-dimethyl aniline.

(B) Compounds having the general formula $$R(XH)_n$$

in which R represents an alkyl radical; X represents oxygen or sulfur; and $n$ is at least one. Typical compounds falling in this group are the aliphatic alcohols such as amyl alcohol (fusel oil), ethylene glycol, isopropyl alcohol, dodecyl alcohol, cyclohexanol, etc.; the aliphatic mercaptans such as amyl mercaptans, mixed aliphatic mercaptans (from mineral oil), tertiary butyl mercaptan, etc. In this group preference is given to the aliphatic mercaptans with particular preference to tertiary butyl mercaptan.

(C) Compounds having the general formula

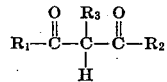

in which $R_1$ and $R_2$ represent alkyl, aryl, aralkyl, alkaryl, alkoxy or aroxy groups and $R_3$ may be hydrogen or a hydrocarbon group. These compounds may be broadly classified as the alpha-gamma diketones, typical examples thereof being ethyl aceto acetate, acetyl acetone, diacetone alcohol, etc. In this general group preference is given to acetyl acetone.

(D) Compounds having the general formula

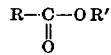

in which R and R' represent hydrocarbon groups. These compounds, which are broadly classified as the organic esters, are typified by amyl acetate, glycol stearate, trihydroxyethylamine stearate, etc.

Examples of specific compounds not falling into the above classification but which have been found to be effective stabilizers of thionitrite solutions and are contemplated herein as compounds which will prevent the accumulation of oxides of nitrogen in the solution are: hydroquinone, substituted hydroquinones, tertiary butyl catechol, o-cresol, salicylaldehyde, and pyridine.

In addition to the foregoing compounds we have employed as a stabilizer in the Diesel fuel oil blends contemplated herein a mixture of compounds available on the market under the tradename "Alox 152," which is understood to be the methyl ester derived from a mixture of fatty alcohols, hydroxy acids and acids containing both hydroxyl and carbonyl groups, as well as ketone alcohols, alcohols, esters and lactones. We have also employed as a stabilizer for Diesel fuel blends of the type contemplated herein a mixture identified as "Mixture X," which is comprised of two parts anthranilic acid and one part of diisoamyl hydroquinone dissolved in isopropyl alcohol.

Classifying the foregoing specific compounds according to the theory of their action, it appears that the hydroquinones, t-butyl catechol, o-cresol, and salicylaldehyde act as antioxidants. The remaining specific compounds apparently act to remove oxides of nitrogen from the blend, "Mixture X" falling into both classifications.

To demonstrate the efficacy of the compounds contemplated herein as stabilizers for Diesel fuel oil-thionitrite blends, we prepared a Diesel fuel oil blend containing 1 per cent of amyl thionitrite and representative stabilizers were added to samples of the blend, which were then stored in two sets under different conditions. One set was stored dry in glass bottles; the other was stored in glass bottles containing water and an iron nail. The effectiveness of the stabilizer was determined primarily by the length of time during which the red color of the thionitrite persisted and the length of time before there was an appearance of sludge in the oil. Table I below gives the results obtained with the samples stored "dry" and Table II sets forth the results obtained with the samples stored over 5 per cent by volume of water with an iron nail in each sample. Both sets of samples were stored at prevailing room temperature.

TABLE I

*Samples stored "dry" in glass*

| Stabilizer | Per cent added by weight | Days elapsed before appreciable color loss | Days elapsed before appearance of sludge |
|---|---|---|---|
| None | | 5 | 3 |
| Do | | 5 | 5 |
| Aniline | 2.5 | 56+ | 19 |
| Monocyclohexylamine | 2.5 | 11 | 56 |
| Dicyclohexylamine | 2.5 | 19 | 56+ |
| Triethylamine | 2.5 | 19 | 19 |
| Mixed isopropanolamines | 2.5 | 11 | 19 |
| Salicylaldehyde | 2.5 | 19 | |
| Fusel oil | 2.5 | 11 | 19+ |
| Ethylene glycol | 2.5 | 11 | 19+ |
| Amyl mercaptan | 2.5 | 56+ | 56+ |
| Ethyl acetoacetate | 2.5 | 5 | 19 |
| Mixed toluidines | 2.5 | 11 | 11 |
| Hydroquinone | 0.5 | 11 | 11 |
| Cyclohexyl hydroquinone | 0.5 | 11 | 11 |
| Diisoamyl hydroquinone | 0.5 | 11 | 11 |
| Tertiary butyl catechol | 0.5 | 56+ | 19 |
| Isopropyl alcohol | 18.6 | 11 | 56+ |
| "Mixture X" | 20.1 | 56+ | 56+ |

TABLE II

*Samples stored over water in presence of iron*

| Stabilizer | Per cent added by weight | Days elapsed before appreciable color loss | Days elapsed before appearance of sludge |
|---|---|---|---|
| None | | <1 | <1 |
| Monocyclohexylamine | 2.5 | 24 | 24 |
| Dicyclohexylamine | 2.5 | 34 | 64+ |
| Triethylamine | 2.5 | 24 | 24 |
| Diethylamine | 2.5 | 8 | 8 |
| Diamylamine | 2.5 | 6 | 10+ |
| Triamylamine | 2.5 | 17 | 17+ |
| Lorol amine | 2.5 | 10 | 17+ |
| Tetradecylamine | 2.5 | 27 | 57+ |
| Oleic amine | 2.5 | 57+ | 57+ |
| Dimethyl cetyl amine | 1.0 | 6 | 10 |
| Aniline | 2.5 | 64+ | 64+ |
| Mixed toluidines | 2.5 | 64+ | 64+ |
| Monoethyl aniline | 2.5 | 1 | 24+ |
| Dimethyl aniline | 2.5 | 8 | 8 |
| C-diamyl aniline | 2.5 | 57 | 57+ |
| N-diamyl aniline | 2.5 | 57+ | 37 |
| p-Dodecyl aniline | 2.5 | 57+ | 57+ |
| Wax aniline | 2.5 | 27 | 27 |
| Fusel oil | 2.5 | 8 | 24 |
| Isopropyl alcohol | 2.5 | 8 | 8 |
| Dodecyl alcohol | 2.5 | 8 | 8 |
| Cyclohexanol | 2.5 | 8 | 8 |
| Diacetone alcohol | 2.5 | 8 | 8 |
| Isopropanol amine | 2.5 | 8 | 8 |
| Amyl mercaptan | 2.5 | 24 | 24 |
| Mixed mercaptans | 2.5 | 24 | 24 |
| t-Butyl mercaptan | 2.5 | 10 | 17+ |
| Amyl acetate | 2.5 | 1 | 8 |
| Glycol stearate | .5 | 2 | 2 |
| t-Butyl catechol | 2.5 | 24 | 8 |
| o-Cresol | 2.5 | 45 | 8 |
| Acetyl acetone | 2.5 | 64+ | |
| Triamyl amine stearate | 2.5 | 17 | 17+ |
| Trihydroxyethylamine stearate | 2.5 | 6 | 6 |
| Pyridine | 2.5 | 8 | 8 |
| Ammonium hydroxide | | 34 | 64+ |
| Alox 152 | 2.5 | 8 | 8 |
| "Mixture X" | 10.5 | 45 | 64+ |

In addition to the foregoing stability tests we have made comparative cetane number determinations on Diesel fuel oil-thionitrite blends containing a representative stabilizing agent (amyl alcohol or fusel oil). In these tests, the results of which are tabulated in Tables III and IV below, we have employed different organic thionitrites in various concentrations as indicated. The fuel oil used for the tests tabulated in Table III was a straight run Diesel oil having an A. P. I. gravity of 40.1 and a cetane number (C. N.) of 52 in the unblended state. The fuel oil used for obtaining the results of Table IV was a catalytically cracked Diesel fuel oil having an A. P. I. gravity of 26.8 and a cetane number of 27. The cetane number determinations were made according to the method described in A. S. T. M. Proc. 38, I, 392 (1938) and were obtained approximately three weeks after preparing the blends. It will be observed that in all cases the blends which contained the thionitrite and the amyl alcohol were far superior to those containing the thionitrite alone and that the amyl alcohol alone had no effect upon the cetane number.

TABLE III

| Sample | Thionitrite added | Per cent by weight | Stabilizer added | Per cent by weight | C. N. | Increased C. N. |
|---|---|---|---|---|---|---|
| 1(a) | Amyl | 1.0 | None | | 54.0 | 2.0 |
| 1(b) | do | 1.0 | Amyl alcohol | 2.5 | 65.5 | 13.5 |
| 2(a) | do | 0.5 | None | | 58.0 | 6.0 |
| 2(b) | do | 0.5 | Amyl alcohol | 1.25 | 65.5 | 13.5 |
| 3(a) | t-Butyl | 0.25 | None | | 59.0 | 7.0 |
| 3(b) | do | 0.25 | Amyl alcohol | 0.62 | 63.0 | 11.0 |
| 4 | None | | do | 5.0 | 52.0 | 0.0 |

TABLE IV

| Sample | Thionitrite added | Per cent by weight | Stabilizer added | Per cent by weight | C. N. | Increased C. N. |
|---|---|---|---|---|---|---|
| 1(a) | t-Butyl | 2.0 | None | | 30.0 | 3.0 |
| 1(b) | do | 2.0 | Amyl alcohol | 5.0 | 36.0 | 9.0 |
| 2(a) | Ethyl | 2.0 | None | | 31.0 | 4.0 |
| 2(b) | do | 2.0 | Amyl alcohol | 5.0 | 36.5 | 9.5 |
| 3 | None | | do | 10.0 | 27.0 | 0.0 |

In addition to the foregoing data we have made determinations to show the effectiveness of representative stabilizers over a prolonged (six months) storage period. The fuel used in these tests was the catalytically cracked Diesel fuel oil stock described above in connection with Table IV. The thionitrite was a mixed alkyl thionitrite prepared from a mixture of crude mercaptans obtained from mineral oil. It will be observed from the results in Table V below that the "Blank"—that is, the fuel oil with 1 per cent of the thionitrite—dropped in cetane number from 33 to 29 in the six months' period, losing 4 points in cetane number, while the loss in all other cases was substantially less. Three of the samples (containing 5 per cent of fusel oil (amyl alcohol), 2 per cent lorol amine, and 2 per cent monocyclohexylamine, respectively) showed a gain in C. N.

TABLE V

| Wt. per cent thionitrite | Stabilizer | Per cent by wt. | Original C. N. | C. N. after 6 months | Change in C. N. |
|---|---|---|---|---|---|
| 1 | None | | 33 | 29 | −4 |
| 5 | Fusel oil | 5 | 34 | 37 | +3 |
| 2 | do | 2 | 33 | 32 | −1 |
| 2 | Oleic amine | 2 | 37 | 35.5 | −1.5 |
| 2 | Lorol amine | 2 | 30 | 33.5 | +3.5 |
| 2 | Monocyclohexylamine | 2 | 31 | 32.5 | −1.5 |

It will be seen from the foregoing results that an organic thionitrite solution such as a Diesel fuel oil blend containing an organic thionitrite may be stabilized against deterioration by the addition thereto of compounds which will prevent the accumulation of the oxides of nitrogen in the blend. The effectiveness of the various compounds used may be explained either on the theory that they react with or absorb the oxides of nitrogen as they are formed or on the theory that they act as antioxidants to prevent their formation or both. The stabilizers may be added in varying proportions, depending upon the manner in which they act, the character and amount of thionitrite in the blend, etc., and in general they produce the desired stabilizing effect in amounts ranging from about 0.1 to about 5 times the quantity of thionitrite present in the solution.

We claim:

1. The method of stabilizing an organic thionitrite solution against deterioration which comprises admixing with said solution a minor proportion of an organic compound which will prevent the accumulation of the higher oxides of nitrogen in the solution.

2. The method of stabilizing an organic thionitrite solution against deterioration which comprises admixing with said solution an organic compound which will react with oxides of nitrogen to form a stable reaction product.

3. The method of stabilizing an organic thionitrite solution against deterioration which comprises admixing with said solution an organic compound which acts as a negative catalyst toward the oxidation of the organic thionitrite.

4. The method of stabilizing an organic thionitrite solution against deterioration which comprises admixing with said solution an organic compound which acts as a negative catalyst toward the oxidation of nitric oxide.

5. The method of stabilizing a blend of Diesel fuel oil and an organic thionitrite against deterioration which comprises admixing with said blend a minor proportion of an organic compound which will prevent the accumulation of the higher oxides of nitrogen in the blend.

6. The method of stabilizing a blend of Diesel fuel oil and an organic thionitrite against deterioration which comprises admixing with said blend a minor proportion of an organic compound which will react with the oxides of nitrogen to form a stable reaction product.

7. The method of stabilizing a blend of Diesel fuel oil and an organic thionitrite against deterioration which comprises admixing with said blend a minor proportion of an organic compound which acts as a negative catalyst toward the oxidation of the organic thionitrite.

8. The method of stabilizing a blend of Diesel fuel oil and an organic thionitrite against deterioration which comprises admixing with said blend a minor proportion of an organic compound which acts as a negative catalyst toward the oxidation of nitric oxide.

9. The method of stabilizing an organic thionitrite solution against deterioration which comprises admixing with said solution a minor proportion of a compound having the general formula

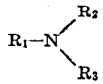

in which $R_1$, $R_2$ and $R_3$ are selected from the group consisting of hydrogen, alkyl, aryl, aralkyl, alkaryl and hydroxyalkyl.

10. The method of stabilizing an organic thionitrite solution against deterioration which comprises admixing with said solution a minor proportion of an organic amine.

11. The method of stabilizing an organic thionitrite solution against deterioration which comprises admixing with said solution a minor proportion of an N-substituted aromatic amine.

12. The method of stabilizing an organic thionitrite solution against deterioration which comprises admixing with said solution a minor proportion of N-dimethyl aniline.

13. The method of stabilizing a blend of Diesel fuel and an organic thionitrite against deterioration which comprises admixing with said blend a minor proportion of a compound having the general formula

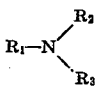

in which $R_1$, $R_2$ and $R_3$ are selected from the group consisting of hydrogen, alkyl, aryl, aralkyl, alkaryl, and hydroxyalkyl.

14. A Diesel fuel oil having in admixture therewith an organic thionitrite and a compound having the general formula

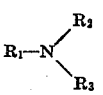

in which $R_1$, $R_2$ and $R_3$ are selected from the group consisting of hydrogen, alkyl, aryl, aralkyl, alkaryl, and hydroxyalkyl.

15. A Diesel fuel oil having in admixture therewith an organic thionitrite and a minor proportion of an organic amine.

16. A Diesel fuel oil having in admixture therewith an organic thionitrite and a minor proportion of an N-substituted aromatic amine.

17. A Diesel fuel oil having in admixture therewith an organic thionitrite and a minor proportion of N-dimethyl aniline.

GEORGE S. CRANDALL.
RICHARD S. GEORGE.
EDWIN M. NYGAARD.

Certificate of Correction

Patent No. 2,328,547.   September 7, 1943.

GEORGE S. CRANDALL, ET AL.

It is hereby certified that error appears in the printed specification of the above numbered patent requiring correction as follows: Page 3, second column, line 60, Table V, last column thereof, for "−1.5" read +$1.5$; and that the said Letters Patent should be read with this correction therein that the same may conform to the record of the case in the Patent Office.

Signed and sealed this 16th day of November, A. D. 1943.

[SEAL]

HENRY VAN ARSDALE,
*Acting Commissioner of Patents.*